United States Patent Office 3,808,133
Patented Apr. 30, 1974

3,808,133
LUBRICATED OXYMETHYLENE COMPOSITION
Northrop Brown, Wilmington, Del., assignor to E. I. du Pont de Nemours and Company, Wilmington, Del.
No Drawing. Continuation-in-part of abandoned application Ser. No. 201,133, Nov. 22, 1971. This application Feb. 28, 1972, Ser. No. 230,047
Int. Cl. C10m 5/12
U.S. Cl. 252—56 R     13 Claims

ABSTRACT OF THE DISCLOSURE

An oxymethylene composition lubricated with a fatty ester derived from a fatty acid and a polyhydric alcohol.

PRIOR APPLICATION

This application is a continuation-in-part of U.S. application Ser. No. 201,133, filed Nov. 22, 1971, now abandoned.

SUMMARY OF THE INVENTION

This invention relates to lubricated oxymethylene compositions. More specifically, this invention refers to a lubricated oxymethylene composition wherein the lubricant is a fatty ester derived from a fatty acid and a polyhydric alcohol.

BACKGROUND OF THE INVENTION

Suitable additives have been sought for a number of years for blending with oxymethylene polymers so that an article fabricated therefrom would, in a bearing application, exhibit a low coefficient of friction and suffer a minimum loss of material through wear. Unfortunately, many additives are deleterious to physical properties. For example, compositions containing 5% or more of dispersed particles of polytetrafluoroethylene which have been used by the trade for many years show a reduced tensile strength and elongation in a molded article.

Interference with processibility is another problem that can result from the presence of additives having lubricating properties. For example, oxymethylene polymers containing common petroleum lubricants or mineral oils often feed poorly through an extruder or molding machine and will not blend properly.

Other additives, such as stearyl alcohol, may impart initial lubricity. However, such lubricity disappears in time or after heating because of volatilization or exudation of the additive.

DETAILED DESCRIPTION OF THE INVENTION

This invention is the discovery of a lubricated oxymethylene composition containing an oxymethylene polymer having at least 80 mol percent oxymethylene (—$CH_2O$—)

units and 0.3 to 5 weight percent based on the weight of the polymer of a fatty ester derived from at least one saturated or unsaturated fatty acid of 12 through 20 carbon atoms and at least one polyhydric alcohol. These readily processible compositions exhibit a long lasting low coefficient of friction and low wear without significant deleterious effect on their physical properties as compared to corresponding unlubricated compositions.

The oxymethylene polymer can be a copolymer of 80 mol percent or more oxymethylene units and up to 20 mol percent of a second comonomer unit or it can be a homopolymer having substantially all $CH_2O$ units. Copolymers are described in U.S. Pat. 3,027,352 and typical homopolymers are described in U.S. Pats. 2,998,409 and 3,161,616. The number average molecular weight of the oxymethylene polymer used in this invention should be higher than 15,000.

Typical of the fatty acids used to make the fatty ester are lauric acid, tridecylic acid, myristic acid, pentadecylic acid, palmitic acid, margaric acid, stearic acid, nonadecylic acid, arachidic acid, oleic acid, elaidic acid and closely related naturally occurring fatty acids or mixtures thereof.

The polyhydric alcohol used to make the fatty ester can be any one or more of the following: ethylene glycol, propylene glycol, homopolymers of ethylene glycol and propylene glycol or copolymers thereof with an average degree of polymerization through 15, as well as glycerol, diglycerol, pentaerythritol, trimethylolmethane, trimethylolethane and trimethylolpropane.

The lubricant is added to the copolymer or homopolymer before, during or after the addition of conventional additives such as antioxidants, stabilizers, pigments, mold release compounds, plasticizers and fillers. Mixing is carried out in a high shear device such as an extruder. The lubricant also can be dry blended with a previously extruded molding powder.

Before addition of any additives, the oxymethylene homopolymer should be stabilized by being either acetate capped or alkyl capped in accordance with customary procedures as shown in U.S. Pat. 2,998,409 and U.S. Pat. 3,161,616.

The amount of fatty ester lubricant added to the oxymethylene polymer, based on the weight of the polymer, is 0.3 to 5 weight percent. A preferred amount of fatty ester is 0.5 to 1.5 weight percent because of the resulting favorable balance of mechanical and lubricating properties in the polymer composition. Amounts greater than 1.5 weight percent tend to adversely affect their mechanical properties. About 1% by weight fatty ester lubricant based on the weight of the polymer is most preferred.

At the higher concentrations of lubricant a penalty in processibility may be encountered; i.e., a decrease in output from the extruder used for mixing the lubricant and the polymer. In such a case the addition of a quantity in the range of 0.2 to 1.0 weight percent of finely divided particles of a copolymer of tetrafluoroethylene (TFE) and hexafluoropropylene (HFP), made in the manner described in the claims of U.S. Pat. 2,946,763, can give improvement in the rate of extrusion or molding.

In order to test a molded article for a satisfactory lubricating property, a friction test is used to determine the article's coefficient of friction. The procedure for determining the coefficient of friction of the molded articles made from the compositions of this invention is a modification of the test set forth in the article entitled, "Wear of Plastics-Evaluation for Engineering Application" by Robert Bee Lewis, appearing as paper No. 63–WA–325, of the Journal of the American Society of Mechanical Engineers (ASME).

FIG. 5 of this ASME article shows a diagram of a thrust washer tester. For the friction test used in the examples below, sample holders are modified so that the upper sample holder contains the molded film to be tested. The lower sample holder is a circular block of "Vespel" polyimide resin which is 5.239 cm. in diameter with a center hole 1.905 cm. in diameter and intended to hold a carbon steel wear ring which has an outer diameter of 3.175 cm., an inner diameter of 2.381 cm. and an average radius of 1,389 cm. The wear ring is held in place with set screws.

A thermocouple measures the sample temperature in the wear ring. The friction torque arm has a strain gauge positioned 12.70 cm. from the axis supporting the wear ring to measure torque. The load exerted on the molded film is 6.35 kg. and the film rotates at a speed of 240 r.p.m.

Each molded film is made by compression molding the polymer composition at 190° C. at 18,100 kg. ram pressure in a laboratory press (Model P–215C, Pasadena Hydraulics Inc.) using an aluminum chase 0.127 mm. thick. The platens are cooled by circulating water while maintaining pressure. Each molded film is measured with a micrometer to allow a maximum variation of 0.025 mm. Each molded film sample is allowed to stand overnight; it is rinsed with acetone aid air dried before testing.

Screening tests indicate that the permanence of an additive (resistance to aging) can be conveniently evaluated by submitting the film sample to a hot air oven treatment before testing. Comparative tests on films suggest that for satisfactory properties in end-use products made from compositions of this invention, a film after aging 40 hours at 120° C. should continue to exhibit a low coefficient of friction as measured by this test.

The wear ring is prepared by manually polishing in random directions with Norton-600A Carborundum paper or the equivalent. The wear ring is then rinsed with acetone and dried thoroughly to remove all abrasive particles.

Each molded film is rotated for ninety minutes against the wear ring and the coefficient of friction is determined from data taken at the end of the time interval in accordance with the following equation.

Coefficient of friction ($\mu$)

$$= \frac{\text{Torque in kilograms from strain gauge} \times 12.70 \text{ cm.}}{6.35 \text{ kg.} \times 1.389 \text{ cm.}}$$

The following examples set forth the invention in still further detail.

EXAMPLE 1

A composition containing acetate capped oxymethylene homopolymer having a number average molecular weight of about 38,000, 0.2% by weight 2.2'-methylene-bis(4-methyl-6-t-butylphenol) and 0.75% by weight nylon terpolymer 6/66/610 (38%/35%/27%) stabilizer is admixed in a high shear mixer (2 inch Sterling extruder) with 1% by weight ethylene glycol distearate. The composition is then extruded and pressed into a 4.445 cm. diameter by 0.127 mm. thick film. This film is tested for coefficient of friction. The coefficient of friction is found to be 0.18.

Another film prepared from the same composition in like manner is then aged for forty hours at 120° C. in air and then allowed to stand overnight at room temperature. The coefficient of friction test is repeated. This film sample has the same coefficient of friction, 0.18.

EXAMPLES 2-9

Example 1 is repeated in all the following Examples 2-8 except that a like amount by weight of the indicated fatty acid ester is substituted for the ethylene glycol distearate of Example 1. For Example 9, six control samples are made in the same manner as the film of Example 1 but without addition of any fatty acid ester. The coefficient of friction of each molded film is measured and the results indicated

| Ex. | Fatty acid ester | Coefficient of— | |
|---|---|---|---|
| | | Friction of non-aged film (as molded) | Friction of aged film |
| 2 | Glyceryl tristearate | 0.18 | |
| 3 | do | 0.20 | |
| 4 | do | | 0.17 |
| 5 | do | | 0.21 |
| 6 | Glyceryl monosterate | | 0.21 |
| 7 | Polyethylene glycol 400 monostearate | 0.27 | |
| 8 | do | | 0.29 |
| 9 | No fatty acid ester (range of six control films) | 0.45-0.68 | |

EXAMPLE 10

A composition is prepared as in Example 1 except that a like amount by weight of diethylene glycol distearate is substituted for the ethylene glycol distearate and there is added 0.5% by weight, based on the weight of oxymethylene polymer present, of a copolymer of TFE and HFP made in accordance with the procedure of U.S. Pat. 2,946,763.

Two films are pressed from this composition is described in Example 1. One film is tested as molded and the other is aged for forty hours at 120° C. in air. The coefficient of friction results for the two films are as follows.

Coefficient of friction of non-aged film (as molded) _ 0.20
Coefficient of friction of aged film _____ 0.24

EXAMPLE 11

Wear test data is also obtained, for two injected molded discs prepared from a like composition as in Example 1, according to the ASME article. The wear test is performed in the manner set forth in the ASME article described above except the wear ring is polished with Norton-600A Carborundum paper to a polish smoother than 16 microinches specified in the ASME article. The wear data is as follows.

Wear factor $\times 10^{10}$ (cu. in. min./ft. lb. hr.)

Sample not aged _____ 7
Sample aged at 120° C. _____ 29

A comparison is made with two molded discs made in the same manner but using 1% by weight stearyl alcohol instead of of ethylene glycol distearate and as a control a third and fourth disc made from a like composition as in Example 1 but not containing any lubricating additive. The wear test data for these samples is as follows.

| Additive | Wear factor $\times 10^{10}$ (cu. in. min./ft. lbs. hr.) | |
|---|---|---|
| | Sample not aged | Sample aged at 120° C. for 40 hours |
| 1% stearyl alcohol | 2 | 84 |
| Control | 85 | |
| Do | 92 | |

It is self-evident from this data that the composition containing the stearyl alcohol loses its lubricity upon aging unlike the composition containing ethylene glycol distearate.

EXAMPLE 12

Molded articles made from the composition of Example 1 are tested for physical properties as compared to a like oxymethylene homopolymer not containing any lubricating additive. The results indicate no significant loss in physical properties caused by the addition of 1% ethylene glycol distearate.

| | Oxymethylene homopolymer, 0.2% by weight 2,2'-methylene-bis (4-methyl-6-t-butylphenol) and 0.75% polyamide 6/66/610 (38%, 35%, 27%) | |
|---|---|---|
| | Control | +1% ethylene glycol distearate |
| Tensile strength, p.s.i | 9,900 | 9,200 |
| Tensile elongation, percent | 31 | 34 |
| Izod impact, ft. lbs./in | 1.23 | 1.22 |

It is expected that the lubricants of this invention will likewise provide satisfactory lubricating properties to copolymers containing at least 80 mol percent (—$CH_2O$—) units.

EXAMPLE 13

A composition containing an oxymethylene copolymer containing about 2 mole percent of —$OCH_2CH_2$— groups in the chain and 0.41% 2,2'-methylene-bis(4-methyl-6-t-butylphenol) and 0.06% dicyandiamide is admixed in a high shear mixer with 1% by weight of ethylene glycol distearate. The composition is pressed into a film 4.445 cm. diameter by 0.127 mm. thick, and the film is aged for forty hours at 120° C. in air as in Example 1. The coefficient of friction in duplicate samples is determined to be 0.25 and 0.27.

From a copolymer composition the same as the above, except containing no ethylene glycol distearate, is pressed a film which is aged as above. The coefficient of friction of the aged film is 0.41.

What is claimed is:

1. A lubricated oxymethylene composition comprising a major amount of an oxymethylene polymer having a molecular weight above 15,000, said polymer having at least 80 mol percent oxymethylene (—CH$_2$O—) units and 0.3 to 5 weight percent, based on the weight of polymer, of a fatty ester derived from at least one saturated or unsaturated fatty acid of 12 through 20 carbon atoms and at least one polyhydric alcohol selected from the group consisting of
   glycerol,
   diglycerol,
   pentaerythritol,
   trimethylolmethane,
   trimethylolethane,
   trimethylolpropane,
   ethylene glycol,
   propylene glycol,
   homopolymers of ethylene glycol having an average degree of polymerization through 15,
   homopolymers of propylene glycol having an average degree of polymerization through 15, and
   copolymers of ethylene glycol with propylene glycol having an average degree of polymerization through 15.

2. A composition according to claim 1 wherein the fatty ester is present in the range of 0.5 to 1.5 weight percent.

3. A composition according to claim 2 wherein the oxymethylene polymer is a homopolymer.

4. A composition according to claim 3 wherein the fatty ester is present at about one weight percent based on the weight of polymer present.

5. A composition according to claim 3 wherein the fatty ester is ethylene glycol distearate.

6. A composition according to claim 3 wherein the fatty ester is glyceryl tristearate.

7. A composition according to claim 3 wherein the fatty ester is glyceryl monostearate.

8. A composition according to claim 3 wherein the fatty ester is diethylene glycol distearate.

9. A composition according to claim 3 wherein the polyhydric alcohol component of the ester is ethylene glycol.

10. A composition according to claim 3 wherein the polyhydric alcohol component of the ester is polyethylene glycol with an average degree of polymerization from 3 to 15.

11. A composition according to claim 3 wherein the polyhydric alcohol component of the ester is propylene glycol.

12. A composition according to claim 3 wherein the fatty acid component of the ester is stearic acid.

13. A composition according to claim 3 wherein the fatty acid component of the ester is palmitic acid.

References Cited

UNITED STATES PATENTS

| | | | |
|---|---|---|---|
| 3,164,563 | 1/1965 | Maxwell et al. | 260—67 FP |
| 3,516,933 | 6/1970 | Andrews et al. | 252—12 |
| 2,210,140 | 8/1940 | Colbeth | 252—56 R |
| 3,114,708 | 12/1963 | Morway et al. | 252—12 |
| 3,287,288 | 11/1966 | Reiling | 252—12 X |
| 3,236,929 | 2/1966 | Jupa et al. | 260—67 |
| 3,340,219 | 9/1967 | Stemmler | 260—18 |
| 3,578,621 | 5/1971 | Stapfer | 260—31.6 |

FOREIGN PATENTS

| | | |
|---|---|---|
| 943,280 | 12/1963 | Great Britain. |
| 1,128,988 | 10/1968 | Great Britain. |

WARREN H. CANNON, Primary Examiner

U.S. Cl. X.R.

252—12, 12.2; 260—18 R, 31.2 R